United States Patent
Hall

(10) Patent No.: US 6,579,931 B1
(45) Date of Patent: Jun. 17, 2003

(54) LOW RESISTIVITY POLYMERIC PTC COMPOSITIONS

(75) Inventor: Tom J. Hall, Arlington Heights, IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/511,872

(22) Filed: Feb. 25, 2000

(51) Int. Cl.$^7$ ............................................. C08K 3/04
(52) U.S. Cl. ...................... 524/495; 524/439; 524/440
(58) Field of Search ............................... 524/495, 439, 524/440

(56) References Cited

U.S. PATENT DOCUMENTS

| | | |
|---|---|---|
| 4,367,306 A | 1/1983 | Maeda et al. |
| 4,481,498 A | 11/1984 | McTavish et al. |
| 4,545,926 A | 10/1985 | Fouts, Jr. et al. |
| 4,775,500 A | 10/1988 | Funakoshi et al. |
| 5,210,517 A | 5/1993 | Abe |
| 5,985,976 A | * 11/1999 | Wartenberg et al. ......... 524/495 |
| 6,114,433 A | * 9/2000 | Chung et al. ................ 524/495 |

FOREIGN PATENT DOCUMENTS

| | | |
|---|---|---|
| JP | 61-181859 | 8/1986 |
| JP | 1-110702 | 4/1989 |

OTHER PUBLICATIONS

Interlocutory Decision in Opposition Proceedings, Aug. 21, 2002, prepared by A. Debre.

* cited by examiner

*Primary Examiner*—Edward J. Cain
(74) *Attorney, Agent, or Firm*—Bell, Boyd & Lloyd LLC

(57) ABSTRACT

Positive temperature coefficient ("PTC") materials for use in electronic components for the protection of electrical circuits. Through the use of an organo-metallic coupling agent, the room temperature resistivity of polymeric PTC materials may be reduced. The PTC materials of the present invention include a polyolefin, a conductive filler and an organo-metallic coupling agent, and have an electrical resistivity at 25° C. of less than 1 ohm cm.

27 Claims, No Drawings

LOW RESISTIVITY POLYMERIC PTC COMPOSITIONS

TECHNICAL FIELD

The present invention relates to conductive polymer compositions which exhibit PTC behavior, and particularly PTC compositions which utilize a coupling agent.

BACKGROUND OF THE INVENTION

It is well known that the resistivity of many conductive materials change with temperature. The resistivity of a positive temperature coefficient (PTC) conductive material sharply increases as the temperature of the material increases over a particular range. Many crystalline polymers, made electrically conductive by dispersing conductive fillers therein, exhibit this PTC effect. These polymers generally include polyolefins such as polyethylene, polypropylene and ethylene/propylene copolymers. At temperatures below a certain value, i.e., the critical or trip temperature, the polymer exhibits a relatively low, constant resistivity. However, as the temperature of the polymer increases beyond the critical point, the resistivity of the polymer sharply increases. Compositions exhibiting PTC behavior have been used in electrical devices as over-current protection in electrical circuits comprising a power source and additional electrical components in series. Under normal operating conditions in the electrical circuit, the resistance of the load and the PTC device is such that relatively little current flows through the PTC device. Thus, the temperature of the device (due to $I^2R$ heating) remains below the critical or trip temperature. If the load is short circuited or the circuit experiences a power surge, the current flowing through the PTC device increases greatly. At this point, a great deal of power is dissipated in the PTC device. This power dissipation only occurs for a short period of time (fraction of a second), however, because the power dissipation will raise the temperature of the PTC device (due to $I^2R$ heating) to a value where the resistance of the PTC device has become so high, that the current is limited to a negligible value. The new current value is enough to maintain the PTC device at a new, high temperature/high resistance equilibrium point. The device is said to be in its "tripped" state. The negligible or trickle through current that flows through the circuit will not damage the electrical components which are connected in series with the PTC device. Thus, the PTC device acts as a form of a current limiter, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Conductive polymer PTC compositions and their use as protection devices are well known in the industry. For example, U.S. Pat. No. 4,237,441 (Van Konynenburg et al.), U.S. Pat. No. 4,304,987 (Van Konynenburg), U.S. Pat. No. 4,545,926 (Fouts, Jr. et al.), U.S. Pat. No. 4,849,133 (Yoshida et al.), U.S. Pat. No. 4,910,389 (Sherman et al.), U.S. Pat. No. 5,106,538 (Barma et al.), and U.S. Pat. No. 5,880,668 (Hall) and EP-730 282 A2 (Unitika) disclose PTC compositions which comprise a thermoplastic crystalline polymer with carbon black dispersed therein. The disclosure of each one of these references is herein incorporated by reference. Conventional polymer PTC electrical devices include a PTC element interposed between a pair of electrodes. The electrodes can be connected to a source of power, thus, causing electrical current to flow through the PTC element.

SUMMARY OF THE INVENTION

It is an object of the present invention to provide a conductive polymer PTC composition with a low room temperature resistivity. Accordingly, in a first aspect of the present invention there is provided a crystalline conductive polymer composition exhibiting PTC behavior, the composition comprising a polyolefin, a conductive particulate filler and a coupling agent.

In a second aspect of the invention, the composition is comprised of a polyolefin in a range of about 45% to 65% by weight of the total composition, a conductive filler in a range of about 35% to 50% by weight of the total composition, and a coupling agent in a range of about 0.1% to 1.0% by weight of the total composition.

In a preferred embodiment of the present invention, the coupling agent comprises an organo-metallic compound. It is believed that the coupling agent promotes the uniform dispersion of the conductive filler throughout the polyolefin. As a result, PTC compositions which include a coupling agent according to the present invention have much lower room temperature resistivities than PTC compositions which do not include a coupling agent. In some cases, the reduction in resistivity is as great as 75%.

Other advantages and aspects of the present invention will become apparent upon reading the following detailed description of the invention.

DETAILED DESCRIPTION

While this invention is susceptible of embodiment in many different forms, there is shown in the examples and will herein be described in detail embodiments and methods of manufacture with the understanding that the present disclosure is to be considered as an exemplification of the principles of the invention and is not intended to limit the broad aspect of the invention to the embodiments illustrated.

The polymer component used in compositions of the present invention may be a single polymer or a mixture of two or more polymers. Generally, the polymer component may comprise a polyolefin having a crystallinity of at least 30%, and preferably more than 70%. Suitable polyolefins include polyethylene, polypropylene, polyvinyladene fluoride, copolymers of polyethylene, polypropylene, ethylene/propylene copolymers, polybutadiene, polyethylene acrylates, and ethylene acrylic acid copolymers.

The polymer component used in the present invention may also be a modified polyolefin. The term modified polyolefin as used herein is defined as a polyolefin having a carboxylic acid or a carboxylic acid derivative. grafted thereto. The carboxylic acid or the carboxylic acid derivative can comprise as much as 10% by weight of the modified polyolefin, preferably 5% by weight of the modified polyolefin, more preferably 3% by weight of the modified polyolefin, especially 1% by weight oft modified polyolefin. An example of PTC compositions and electrical devices utilizing modified polyolefins is disclosed in U.S. Pat. No. 5,880,668, the disclosure of which is incorporated herein by reference.

Suitable conductive particulate fillers for use in the present invention include nickel powder, silver powder, gold powder, copper powder, silver-plated copper powder, powders of metal alloys, carbon black, carbon powder, and graphite. Preferably, the conductive particulate filler comprises about 35% to about 50% by weight of the total composition.

The coupling agents used in the present invention are preferably comprised of an organo-metallic compound. Suitable examples of such compounds fall under the classifications of neoalkoxy titanates and neoalkoxy zirconates manufactured by Kenrich Petrochemical, Inc. located in Bayonne, N.J.

Specific examples of neoalkoxy titanates include: titanium IV 2,2(bis 2-propenolatomethyl) butanolato, tris neodecanoato-0, titanium IV 2,2(bis 2-propenolatomethyl) butanolato, tris(dodecyl) benzenesulfonato-0, titanium IV 2,2 (bis 2-propenolatomethyl) butanolato, tris(dioctyl) phosphato-0, titanium IV 2,2 (bis 2-propenolatomethyl) butanolato, tris(dioctyl) pyrophosphato-0, titanium IV 2,2 (bis 2-propenolatomethyl) butanolato, tris(2-ethylenediamino) ethylato, titanium IV 2,2 (bis 2-propenolatomethyl) butanolato, tris(3-amino) phenylato, and titanium IV 2,2 (bis 2-propenolatomethyl) butanolato, tris(6-hydroxy) hexanoato-0.

Specific examples of neoalkoxy zirconates include: zirconium IV 2,2 (bis-2-propenolatomethyl) butanolato, tris neodecanolato-0, zirconium IV 2,2 (bis-2-propenolatomethyl) butanolato, tris(dodecyl) benzenesulfonato-0, zirconium IV 2,2 (bis-2-propenolatomethyl) butanolato, tris(dioctyl) phosphato-0, zirconium IV 2,2(bis-2-propenolatomethyl) butanolato, tris 2-methyl-2-propenoato-0, zirconium IV 2,2 (bis-2-propenolatomethyl) butanolato, tris(dioctyl) pyrophosphato-0, zirconium IV 2,2 (bis-2-propenolato) butanolato, tris 2-propenoato-0, zirconium IV 2,2 (bis-2-propenolatomethyl) butanolato, tris(2-ethylenediamino) ethylato, zirconium IV bis 2,2(bis-2-propenolatomethyl) butanolato, bis(para amino benzoato-0), zirconium IV bis 2,2 (bis-2-propenolatomethyl) butanolato, bis(3-mercapto) propionato-0, and zirconium IV 1,1 (bis-2-propenolatomethyl) butanolato, tris(2-amino) phenylato.

Preferably, the coupling agent comprises about 0.1% to about 1% by weight of the total composition.

Depending on the percentage of conductive particulate filler, the PTC compositions of the present invention will exhibit the following PTC behavior: (1) an initial resistivity at 25° C. of less than 5 ohm cm, preferably less than 2 ohm cm, and especially less than 1 ohm cm; and, (2) a peak resistivity of at least 1,000 ohm cm, preferably at least 10,000 ohm cm, and especially at least 100,000 ohm cm.

Lower resistivities that may be achieved by utilizing a coupling agent in a PTC composition is illustrated by way of the following three examples. In each example, a PTC composition was prepared in the same manner and comprised a coupling agent. Three similar corresponding comparison examples were prepared without a coupling agent.

EXAMPLE 1

A quantity of 119.28 grams of modified polyolefin comprised of 99% by weight high density polyethylene and 1% by weight maleic anhydride (manufactured by Du Pont under the tradename Fusabond 'E' MB-100D) having a specific gravity of 0.90–0.96 and a melt temperature of approximately 130° C. was placed in a C. W. Brabender PlastiCorder PL 2000 equipped with an Extruder Measuring Head and fluxed at 200° C. for approximately 5 minutes at 80 rpm. A quantity of 0.72 grams of a coupling agent (manufactured by Kenrich Petrochemicals under the tradename NZ 38/H) was combined with the modified polyolefin and mixed at 80 rpm and 200° C. for 5 minutes. Next, a quantity of 120.0 grams of carbon black (manufactured by Columbia Chemicals under the tradename Raven 430) was incorporated into the mixture and fluxed at 200° C. for 5 minutes at 20 rpm. The mixture was then fluxed at 200° C. at 80 rpm for an additional 5 minutes. The composition was extruded through the Brabender PlastiCorder 2000 having barrel temperatures of 190° C., 200° C. and 210° C., respectively, to form a composite sheet. A plaque of approximately 2 inches by 2 inches by 0.010 inches was made from the composite sheet and the resistivity at approximately 25° C. was determined to be 1.30 ohm cm.

Comparison Example 1

A composition identical to the composition of Example 1, except that a coupling agent was not included, was also prepared and tested. Comparison Example 1 was prepared in the same manner as Example 1. The resistivity of Comparison Example 1 at approximately 25° C. was determined to be 2.10 ohm cm.

EXAMPLE 2

A second composition was prepared according to the same method as Example 1, except that a different polyolefin was employed. Instead of adding Fusabond, 119.28 grams of a high density polyethylene (HDPE, manufactured and sold by Quantum Chemicals under the tradename Petrothene) were added to the Brabender PlastiCorder 2000. The same amounts of carbon black and coupling agent were used. The composition of Example 2 had a resistivity at approximately 25° C. of 1.20 ohm cm.

Comparison Example 2

A composition identical to the composition of Example 2, except that a coupling agent was not included, was also prepared and tested. Comparison Example 2 was also prepared in the same manner as Example 1. The resistivity of Comparison Example 2 at approximately 25° C. was measured at 1.35 ohm cm.

EXAMPLE 3

191.10 grams of polyvinyladene fluoride, (PVDF, manufactured and sold by Atochem North America, Inc. under the tradename Kynar) were added to the Brabender PlastiCorder 2000 and fluxed at 250° C. for approximately 5 minutes at 80 rpm. A quantity of 0.90 grams of a coupling agent (manufactured by Kenrich Petrochemicals under the tradename NZ 38/H) was combined with the modified polyolefin and mixed at 80 rpm and 250° C. for 5 minutes. Next, a quantity of 108.0 grams of carbon black (manufactured by Columbia Chemicals under the tradename Raven 430) was incorporated into the mixture and fluxed at 250° C. for 5 minutes at 20 rpm. The mixture was then fluxed at 200° C. at 80 rpm for an additional 5 minutes. The composition was extruded through the Brabender PlastiCorder 2000 having barrel temperatures of 250° C., 256° C. and 280° C., respectively to form a composite sheet. A plaque of approximately 2 inches by 2 inches by 0.010 inches was made from the composite sheet and the resistivity at approximately 25° C. was determined to be 0.72 ohm cm.

Comparison Example 3

A composition identical to the composition of Example 3, except that a coupling agent was not included, was also prepared and tested. Comparison Example 3 was prepared in the same manner as Examples 1 and 2. The resistivity of Comparison Example 3 at approximately 25° C. was measured at 2.34 ohm cm.

Table I below illustrates the change in resistivity that may be achieved by utilizing a coupling agent according to the present invention. Table I highlights the lower resistivity which can be achieved by employing a coupling agent. Resistivities in a range of about 11%–77% lower may be achieved by the use of a coupling agent according to the present invention.

TABLE I

| Sample | Polyolefin | Carbon Black | Coupling Agent | Resistivity |
| --- | --- | --- | --- | --- |
| Example 1 | Modified Polyolefin Fusabond ™ 49.7% | 50% | 0.30% | 1.30 ohm cm |
| Comparison Example 1 | Modified Polyolefin Fusabond ™ 50% | 50% | 0 | 2.10 ohm cm |
| Example 2 | HDPE (Petrothene) 49.7% | 50% | 0.30% | 1.35 ohm cm |
| Comparison Example 2 | HDPE (Petrothene) 50% | 50% | 0 | 1.20 ohm cm |
| Example 3 | PVDF (Kynar) 63.7% | 36% | 0.30% | 0.72 ohm cm |
| Comparison Example 3 | PVDF (Kynar) 63.9% | 36.1% | 0 | 2.34 ohm cm |

I claim:

1. A crystalline conductive polymer composition exhibiting PTC behavior, the composition comprising a polyolefin, a conductive particulate filler and an organo-metallic coupling agent, wherein the organo-metallic coupling agent is a compound selected from the group including titanium IV 2,2 (bis 2-propenolatomethyl) butanolato, tris neodecanoato-0, titanium IV 2,2 (bis 2-propenolatomethyl) butanolato, tris(dodecyl) benzenesulfonato-0, titanium IV 2,2 (bis 2-propenolatomethyl) butanolato, tris(dioctyl) phosphato-0, titanium IV 2,2 (bis 2-propenolatomethyl) butanolato, tris(dioctyl) pyrophosphato-0, titanium IV 2,2 (bis 2-propenolatomethyl) butanolato, tris(2-ethylenediamino) ethylato, titanium IV 2,2 (bis 2-propenolatomethyl) butanolato, tris(3-amino) phenylato, titanium IV 2,2 (bis 2-propenolatomethyl) butanolato, tris (6-hydroxy) hexanoato-0, zirconium IV 2,2 (bis-2-propenolatomethyl) butanolato, tris neodecanolato-0, zirconium IV 2,2 (bis-2-propenolatomethyl) butanolato, tris (dodecyl) benzenesulfonato-0, zirconium IV 2,2 (bis-2-propenolatomethyl) butanolato, tris(dioctyl) phosphato-0, zirconium IV 2,2 (bis-2-propenolatomethyl) butanolato, tris 2-methyl-2-propenoato-0, zirconium IV 2,2 (bis-2-propenolatomethyl) butanolato, tris(dioctyl) pyrophosphato-0, zirconium IV 2,2 (bis-2-propenolato) butanolato, tris 2-propenoato-0, zirconium IV 2,2 (bis-2-propenolatomethyl) butanolato, tris(2-ethylenediamino) ethylato, zirconium IV bis 2,2 (bis-2-propenolatomethyl) butanolato, bis(para amino benzoato-0), zirconium IV bis 2,2 (bis-2-propenolatomethyl) butanolato, bis(3-mercapto) propionato-0, and zirconium IV 1,1 (bis-2-propenolatomethyl) butanolato, tris(2-amino) phenylato.

2. The composition of claim 1, wherein the polyolefin comprises a polymer selected from the group consisting of polyethylene, polypropylene, polyvinylidene fluoride, copolymers of polyethylene, copolymers of polypropylene and ethylene/propylene copolymers.

3. The composition of claim 1, wherein the polyolefin is modified to include a carboxylic acid or a carboxylic acid derivative.

4. The composition of claim 3, wherein the carboxylic acid derivative comprises a derivative selected from the group consisting of acyl chlorides, carboxylic anhydrides, carboxylic esters, amides, and thiol esters.

5. The composition of claim 3, wherein the modified polyolefin comprises polyethylene and maleic anhydride.

6. The composition of claim 1, wherein the organo-metallic coupling agent comprises a metallic component selected from the group including titanium and zirconium.

7. The composition of claim 1, wherein the organo-metallic coupling agent promotes a uniform distribution of the conductive particulate filler throughout the polyolefin.

8. The composition of claim 1, wherein the composition has an electrical resistivity at 25° C. of less than 5 ohm cm.

9. The composition of claim 1, wherein the composition has an electrical resistivity at 25° C. of less than 2 ohm cm.

10. The composition of claim 1, wherein the composition has an electrical resistivity at 25° C. of less than 1 ohm cm.

11. A crystalline conductive polymer composition exhibiting PTC behavior, the composition comprising:
a polyolefin of about 45% to 65% by weight of the total composition;
a conductive filler of about 35% to 50% by weight of the total composition; and
a coupling agent of about 0.1% to 1.0% by weight of the total composition, wherein the coupling agent is comprised of an organo-metallic compound, wherein the coupling agent is a compound selected from the group including titanium IV 2,2 (bis 2-propenolatomethyl) butanolato, tris neodecanoato-0, titanium IV 2,2 (bis 2-propenolatomethyl) butanolato, tris(dodecyl) benzenesulfonato-0, titanium IV 2,2 (bis 2-propenolatomethyl) butanolato, tris(dioctyl) phosphato-0, titanium IV 2,2 (bis 2-propenolatomethyl) butanolato, tris(dioctyl) pyrophosphato-0, titanium IV 2,2 (bis 2-propenolatomethyl) butanolato, tris(2-ethylenediamino) ethylato, titanium IV 2,2 (bis 2-propenolatomethyl) butanolato, tris(3-amino) phenylato, titanium IV 2,2 (bis 2-propenolatomethyl) butanolato, tris(6-hydroxy) hexanoato-0, zirconium IV 2,2 (bis-2-propenolatomethyl) butanolato, tris neodecanolato-0, zirconium IV 2,2 (bis-2-propenolatomethyl) butanolato, tris(dodecyl) benzenesulfonato-0, zirconium IV 2,2 (bis-2-propenolatomethyl) butanolato, tris(dioctyl) phosphato-0, zirconium IV 2,2 (bis-2-propenolatomethyl) butanolato, tris 2-methyl-2-propenoato-0, zirconium IV 2,2 (bis-2-propenolatomethyl) butanolato, tris(dioctyl) pyrophosphato-0, zirconium IV 2,2 (bis-2-propenolato) butanolato, tris 2-propenoato-0, zirconium IV 2,2 (bis-2-propenolatomethyl) butanolato, tris(2-ethylenediamino) ethylato, zirconium IV bis 2,2 (bis-2-propenolatomethyl) butanolato, bis(para amino benzoato-0), zirconium IV bis 2,2 (bis-2-propenolatomethyl) butanolato, bis(3-mercapto) propionato-0, and zirconium IV 1,1 (bis-2-propenolatomethyl) butanolato, tris(2-amino) phenylato.

12. The composition of claim 11, wherein the coupling agent includes a material selected from the group including titanium and zirconium.

13. The composition of claim 11, wherein the composition has an electrical resistivity at 25° C. of less than 1 ohm cm and a peak resistivity at a temperature greater than 25° C. of at least 100,000 ohm cm.

14. The composition of claim 11, wherein the polyolefin has a crystallinity of greater than 40%.

15. A crystalline conductive polymer composition exhibiting PTC behavior, the composition comprising:
   high density polyethylene;
   carbon black; and
   an organo-metallic coupling agent, wherein the organo-metallic coupling agent includes a conductive material selected from the group including titanium and zirconium.

16. The composition of claim 15, wherein the composition has an electrical resistivity at 25° C. of less than 1 ohm cm.

17. The composition of claim 15, wherein the organo-metallic coupling agent comprises approximately 0.1% to 1.0% by weight of the total composition.

18. A crystalline conductive polymer composition exhibiting PTC behavior, the composition comprising a polyolefin, a conductive particulate filler and an organo-metallic coupling agent, wherein the organo-metallic coupling agent promotes a uniform distribution of the conductive particulate filler throughout the polyolefin.

19. The composition of claim 18, wherein the polyolefin comprises a polymer selected from the group consisting of polyethylene, polypropylene, polyvinylidene fluoride, copolymers of polyethylene, copolymers of polypropylene and ethylene/propylene copolymers.

20. The composition of claim 18, wherein the coupling agent is a compound selected from the group including titanium IV 2,2 (bis 2-propenolatomethyl) butanolato, tris neodecanoato-0, titanium IV 2,2 (bis 2-propenolatomethyl) butanolato, tris(dodetyl) benzenesulfanato-0, titanium IV 2,2 (bis 2-propenolatomethyl) butanolato, tris(diocytl) phosphato-0, titanium IV 2,2 (bis 2-propenalatomethyl) butanolato, tris(dioctyl) pyrophosphato-0, titanium IV 2,2 (bis 2-propenolatomethyl) butanolato, tris(2-ethylenediamino) ethylato, titanium IV 2,2 (bis 2-propenolatomethyl) butanolato, tris(3-amino) phenylato, titanium IV 2,2 (bis 2-propenolatomethyl) butanolato, tris (6-hydroxy) hexanoato-0, zirconium IV 2,2 (bis-2-propenolatomethyl) butanolato, tris neodecaolato-0, zirconium IV 2,2 (bis-2-propenolatomethyl) butanolato, tris (dodecyl) benzenesulfonato-0, zirconium IV 2,2 (bis-2-propenolatomethyl) butanolato, tris(dioctyl) phosphato-0, zirconium IV 2,2 (bis-2-propenolatomethyl) butanolato, tris 2-methyl-2-propenoato-0, zirconium IV 2,2 (bis-2-propenolatomethyl) butanolato, tris(dioctyl) pyrophosphato-0, zirconium IV 2,2 (bis-2-propenolato) butanolato, tris 2-propenoato-0, zirconium IV 2,2 (bis-2-propenolatomethyl) butanolato, tris(2-ethylenediamin) ethylato, zirconium IV bis 2,2 (bis-2-propenolatomethyl) butanolato, bis(para amino benzoato-0), zirconium IV bis 2,2 (bis-2-propenolatomethyl) butanolato, bis(3-mercapto) propionato-0, and zirconium IV 1,1 (bis-2-propenolatomethyl) butanolato, tris(2-amino) phenylato.

21. The composition of claim 18, wherein the polyolefin is modified to include a carboxylic acid or a carboxylic acid derivative.

22. The composition of claim 21, wherein the carboxylic acid derivative comprises a derivative selected from the group consisting of acyl chlorides, carboxylic anhydrides, carboxylic esters, amides, and thiol esters.

23. The composition of claim 21, wherein the modified polyolefin comprises polyethylene and maleic anhydride.

24. The composition of claim 18, wherein the coupling agent comprises a metallic component selected from the group including titanium and zirconium.

25. The composition of claim 18, wherein the composition has an electrical resistivity at 25° C. of less than 5 ohm cm.

26. The composition of claim 18, wherein the composition has an electrical resistivity at 25° C. of less than 2 ohm cm.

27. The composition of claim 18, wherein the composition has an electrical resistivity at 25° C. of less than 1 ohm cm.

* * * * *